Aug. 28, 1956  R. C. WOOD  2,760,543
GAS HEATED DIMPLING DIE
Filed Oct. 19, 1950
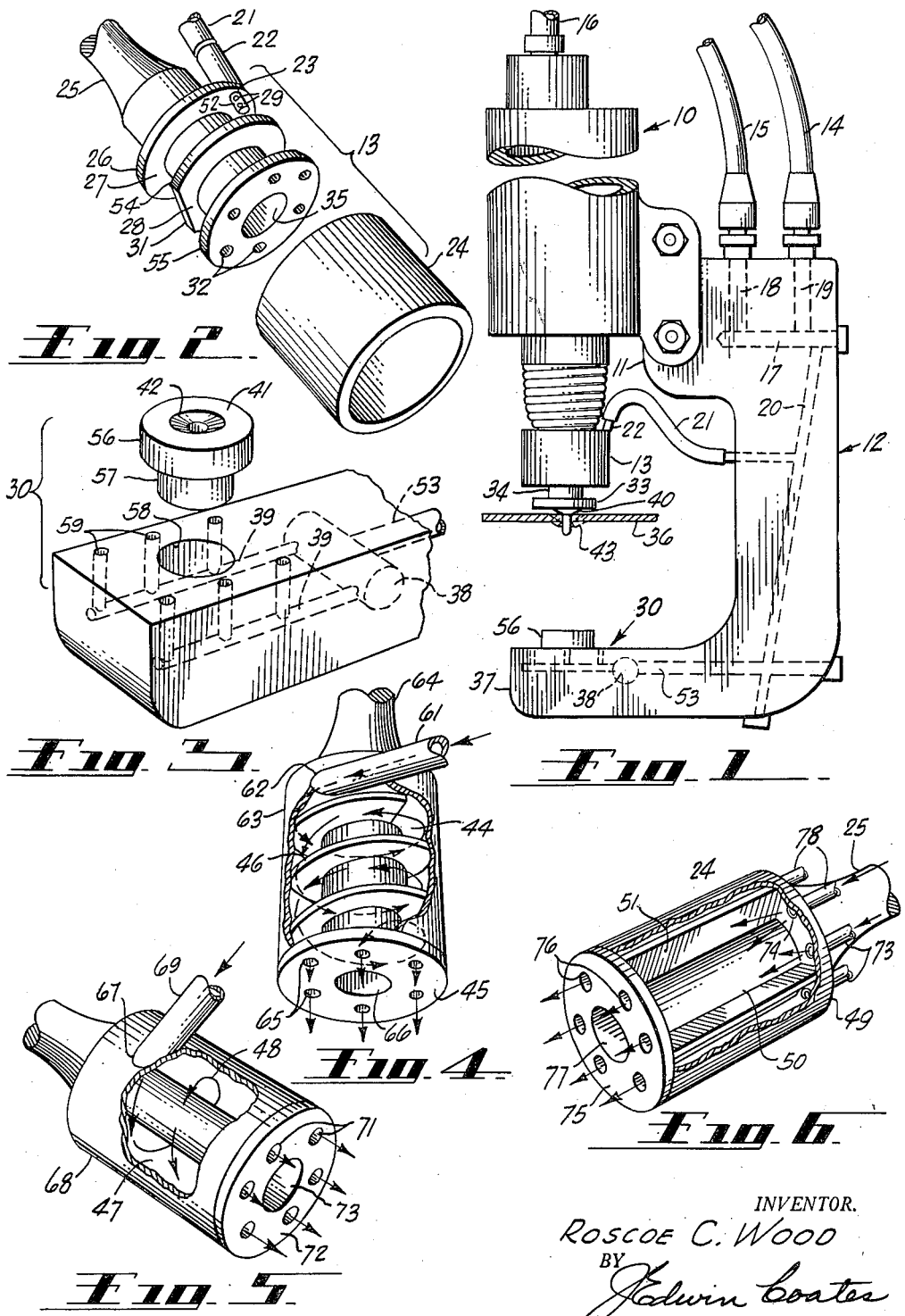
INVENTOR.
ROSCOE C. WOOD
BY
Edwin Coates
·ATTORNEY·

United States Patent Office 2,760,543
Patented Aug. 28, 1956

2,760,543

GAS HEATED DIMPLING DIE

Roscoe C. Wood, North Torrance, Calif., assignor to Douglas Aircraft Company, Inc., Santa Monica, Calif.

Application October 19, 1950, Serial No. 190,993

7 Claims. (Cl. 153—21)

This invention relates to hot forming of materials and more particularly to methods and apparatus for heating dimple dies and the material to be formed thereby.

The apparatus of the present invention comprises in its broadest aspects a heat generation chamber axially surrounding or in close proximity to the shaft of a dimple die. The new method involves the feeding of combustible gas into the chamber at a predetermined pressure. The gases are burned completely while within the chamber and then are forced out openings in one end of the chamber. The openings are so aligned and spaced that an even flow of burned gas is directed past the dimple die and against the work to be hot formed.

Various electrical resistance and induction heating devices have previously been proposed and used in order to heat material to be hot dimpled. However, because of their weight, complexity and size such systems do not lend themselves to portable use. This fact has handicapped dimpling operations in the aircraft industry in particular since it is often desirable to be able to hot dimple material in place on the airplane or on one of its component parts. In the past it has been necessary that material to be dimpled be brought to the hot dimpling unit. This, of course, causes production time loss within the plant and prohibits the making of repairs involving hot dimpling in any location which is not equipped with such units.

Attempts to provide a portable dimpling unit of the electrically heated variety have never been successful. Moreover, in recent years skin thicknesses for airplanes have been greatly increased with the result that portable dimpling tools using electric heating means are necessarily even more bulky. Moreover, they require too great a dwell time to heat the material to dimpling temperatures and are too fragile. Breakage in use is a common occurrence and operational costs are consequently high. The industry's experience has been that a satisfactory electrically heated dimpling unit is necessarily so bulky that it ceases to be portable.

The gas heater of the present invention obviates these difficulties by reason of its simple, rugged and compact construction. It utilizes a less complex method of applying the required amounts of heat to the desired area of the material to be formed. Heat is applied by exhausting the burned gases directly against the material and by conducting heat through the chamber wall surrounding or in close proximity to the dimple die shanks.

The chamber itself may assume various configurations so long as its capacity is such that, for a predetermined type of combustible gas fed through a set size of inlet orifice at a selected range of pressures, it will permit complete combustion of the gas prior to the time that the gas reaches the exhaust openings in the opposite end of the chamber. In use it heats quickly and will operate with safety even in areas where such fire hazards as inflammable lacquers and paints are used. The dwell time for heating a sheet of material of a given type and thickness preparatory to dimpling compares very favorably with the dwell times required for the non-portable electrically heated type of dimpling unit.

Breakage caused by vibration has thus been eliminated and the expense of operation has thus been decreased by use of this new apparatus and method. The reduction in size and weight enables the operator to handle the unit easily. The entire unit, including the gas supply containers, is easily mounted in a small cart enabling the unit to be moved about the plant or out onto an airfield for quick repair jobs. The entire unit is thus self contained and requires no mounting jigs, large instrument panels or electrical conduit lines such as those required for electrical methods.

Other features and advantages of the present invention will be apparent from the following description taken in connection with the accompanying drawing in which:

Figure 1 is a side elevational view, with parts broken away, of a hot dimpling unit showing two embodiments of the heater, each surrounding the shaft of a dimple die, a portion of the material to be formed being shown in section;

Figure 2 is an exploded perspective view to an enlarged scale of the heater that is shown surrounding the upper dimple die of Figure 1;

Figure 3 is an exploded perspective view to an enlarged scale of the second heater shown in Figure 1 with the lower dimple die in position for insertion in the die seat;

Figure 4 is a perspective view to an enlarged scale of another embodiment of the heater with a portion of the cylindrical shell cut away to show the heat generation chamber;

Figure 5 is a perspective view to an enlarged scale of a further modified form of the heater with a portion of the cylindrical shell cut away to show the heat generation chamber; and Figure 6 is a perspective view to an enlarged scale of still another embodiment of the heater with a portion of the cylindrical shell cut away to show the heat generation chamber.

Referring now to the drawing, an air buck or pneumatically operated reciprocating mechanism 10 is mounted on the upper jaw 11 of a yoke 12 as shown in Figure 1. Combustible gases are fed to the burners 13 and 30 by means of flexible conduits 14 and 15. Compressed air is supplied to the reciprocating mechanism by a similar conduit 16. If acetylene and oxygen are used the oxygen enters the mixing chamber 17 by way of an oxygen inlet 18 while the acetylene passes through the acetylene inlet 19. The combustible gas mixture then enters the gas supply line 20 and a portion of the mixture passes into the upper burner by way of a flexible hose 21 which is connected to a gas injection tube 22. The remainder enters the lower burner 30 by way of another gas injection tube 53.

Figure 2 illustrates one preferred embodiment of the burner 13 for carrying out this new method of heating material to be hot dimpled. The gas injection tube 22 has a reduced tip 52 which is inserted, through an opening 23 in the wall 26 at one end of a sleeve or cylindrical shell 24 which forms the outer wall of the burner. A rigid support shaft 25 having annular flanges or chamber walls 26, 54 and 55 machined or otherwise formed on it is adapted to fit within the sleeve, thereby defining an annular combustion chamber 27 which is axially spaced from an annular exhaust chamber 28 by the middle flange 54 which forms a common wall.

At least one inlet orifice 29 is provided in the tip 52 of the injection tube 22. In the preferred embodiment the end of the tip is closed and the tube projects into the combustion chamber at an acute angle of about 10 to 30 degrees with the axis of the support shaft 25. An equal number of inlet orifices 29 are provided in diametrically opposite portions of the tip. The gas thus enters the combustion chamber in two opposite substantially tangential directions. The gas from each inlet orifice travels approximately 180° of the toroidal path defined by the chamber. During this movement the gases are burned and pass on into the exhaust chamber by way of a passage or exit orifice formed between the wall 24 and the flat 31 located at the point, approximately 180° from the inlet orifices, where the two streams of gas meet. The burned gases again split and commence to follow the two 180° paths defined by the exhaust chamber 28. In so doing, portions of the burned gas enter each of a plurality of axially extending openings 32 which serve to direct the hot gases past the male dimple die 33, the shank 34 of which is seated in the die seat 35 bored in the end of the support shaft 25. The gases, in passing through chambers 27 and 28, impart a substantial amount of heat to the shaft 25. Soon after the gases pass the dimple die they will strike the material 36 to be formed. Thus the material is heated by direct contact with the gases and by heat conducted through the shaft 25 to the die shank 34 and thence to the dimple die 33.

The embodiment shown in Figure 3 is now preferred for use as the lower burner 30 of the unit shown in Figure 1 since it can be formed in the lower jaw 37 of the yoke 12 by simple drilling operations. One or more gas injection tubes 53 carry combustible gases to a cylindrical combustion chamber 38 formed in the yoke jaw. Substantially all of the gases are burned in this chamber and then pass into exhaust chambers 39 by way of one or more exit orifices or passages in the opposite wall of the chamber.

The lower dimple die 56 and its supporting shank 57 are mounted in the die shank seat 58 drilled or otherwise formed in the lower yoke jaw 37. Axially extending openings 59 surrounding the die seat direct the burned exhaust chamber gases axially past the die onto the material 36 to be formed. Thus the opposite side of the material is also heated by direct contact with the hot exhaust gases and by conduction as previously described.

In use it has been found that such common welding and cutting gases as acetylene, hydrogen or a liquid gas such as propane will satisfactorily serve as the combustible gas. The entire unit can be made portable and is readily handled by a single operator. In operation the heater units of Figure 1 are turned on and a lighted match is held near the openings 32 and 59. The flame immediately travels into the combustion chambers where it remains until the gas supply is cut off. No fire hazard is present as the exhaust gases cool sufficiently in traveling out of the burner. For example, it has been found that paper will not be ignited though held in close proximity to the openings while the burner is in operation. Highly volatile and inflammable lacquer thinners have been sprayed against the heater in operation without ignition occurring. This permits use of the dimpling unit in areas where inflammable paints and lacquers are located without danger of fire or explosion. This fact is of particular importance in the aircraft industry where such lacquers are used extensively.

To dimple a piece of material the operator simply positions the dies over the point to be dimpled. The air buck mechanism 10 is actuated to bring the heated head of male dimple die 33 into firm contact with the material 36. This forces the opposite side of the material into contact with the heated anvil 41 of the female dimple die 56. After a predetermined dwell time has passed the air buck mechanism is further actuated to cause the male die 33 to vibrate rapidly in an axial direction. The impact or series of impacts forces the material against the forming seat 42 thereby completing the hot dimpling operation by forming a dimple 43.

During the entire operation the hot gases are continuously directed against the general area to be dimpled. The immediate area to be dimpled is further heated by contact with the head 40 of the male dimple die and the anvil of the female dimple die.

Figure 4 illustrates another embodiment of the heater which has been found to be satisfactory. In this instance the gas injection tube 61 is seated in a substantially tangential opening 62 in the sleeve 63. This permits the gas leaving the inlet orifice to follow the path defined by the helical heat generation chamber 44, said helical chamber being formed by the shaft 64, the sleeve 63 and the helical barrier 46. Axially extending openings 65 formed in the chamber end wall 45 again serve to direct the gases axially past the dimpling dies. The die seat 66 serves to support and surround the shank of the male or female die. Again the pressure, nature of the gas and the orifice size control the temperature of the exhaust gases. The size of the chamber is such that combustion is completed within the chamber.

Referring again to the embodiment shown in Figure 2 it is apparent that it can be made to function in a manner more analogous to the helical type heater of Figure 4 simply by altering the configuration and location of the injection tube and opening 23 and by changing the location of the flat 31. The injection tube, equivalent to the tube 61 of Figure 4, would be positioned in an opening in the shell 24 so that the gas flow would be substantially tangential to the annular chamber walls formed by the sleeve 24, the annular flanges 26, 54 and 55, and the shaft 25. The flat 31 should then be located immediately below the substantially tangential opening for the injection tube. The gas would then travel nearly 360° before reaching the passage formed by the sleeve 24 and the flat 31. It then would enter the exhaust chamber 28 and follow the annular path therein defined until leaving by way of the axially extending openings 32 as previously described.

Another form of this novel heater is shown in Figure 5. In this case the helical barrier 46 of Figure 4 is omitted with the result that the heat generation chamber 47 constitutes a simple toroidal chamber space. Again a substantially tangential opening 67 is provided in the shell 68 and is adapted to receive the gas injection tube 69. The gas leaving the injection tube orifice thus tends to follow a spiral path 48 until the burned gases pass through the axially aligned openings 71 formed in the end wall 72 and surrounding the die mounted in the die seat 73.

Figure 6 depicts a further application of this new method of heating dimpling dies and the material to be formed thereby. The injection tubes 78 are mounted in openings in one chamber end wall 49 of the heat generation chamber 50. A series of baffles 51 divide the chamber into compartments, each of which is supplied with gas from its corresponding inlet orifices 74. The opposite chamber end wall 75 contains a series of axially aligned openings 76 which again serve to direct the exhaust gases from each compartment axially past the dimpling die mounted in the die seat 77.

The heaters of the present application may be formed by making use of various procedures such as machining, forging, welding, or casting. The size and configuration must be determined largely by the consideration of such factors as the nature of the material to be dimpled, type of gas, gas pressure and the temperature desired. As an example of actual use it has been found that 75–ST aluminum 1/16" thick may be hot dimpled at any point which is at least 3" from surrounding airplane structure by means of a hot dimpling unit such as that shown in Figure 1 using oxygen and acetylene gas at a pressure of approximately 10 inches of water. The operational temperature range used was 600° to 800° F., although temperatures above and below this may be reached if desired. The heater used on the male dimple die was approximately 7/8 of an inch in axial length and 1 3/8 inches in diameter. The lower heater utilized a combustion chamber 7/8 of an inch long and 5/16 of an inch in diameter. The dwell time was 10 seconds.

The inlet tube may be force fitted, welded, threaded or otherwise secured to one end of the sleeve or adjacent parts. The shaft and its attached flanges, baffles or barriers may likewise be secured within the shell or to the shaft by welding, threading, force fitting or other means well known to those skilled in the art of working and machining metal. It has been found, for example, that the burner parts may be made of steel such as SAE-4130. The components then can be assembled by use of chrome-molybdenum welds along appropriate lines of jointure. The entire assembly may then be heat treated if circumstances require.

Although the now preferred embodiments and methods of the present invention have been illustrated and described it is to be understood that the invention need not be limited thereto for it is susceptible to changes in form, detail and application within the scope of the appended claims.

I claim:

1. A burner of the class which utilizes combustible gas supplied by conduit means to heat material to be formed by a forming tool having a shank portion, comprising: a hollow generally cylindrical body member having end walls serving as a combustion and exhaust chamber and having a plurality of inlet ports at one end for attachments to conduit means and a plurality of corresponding outlet ports at another end; a shank-receiving member coaxially disposed within said body member and provided with an axial bore to receive the shank portion of said forming tool; a plurality of baffles disposed within said body member along planes formed by the axis of said body member and lines radially extending therefrom, said baffles serving to divide said chamber into a plurality of combustion and exhaust compartments communicating between said inlet and outlet ports; whereby the products of combustion will transmit heat directly to said axial member and the shank portion of said forming tool, and will flow out of said body member through said outlet ports.

2. A burner of the class which utilizes combustible gas supplied by conduit means to heat material to be formed by a forming tool having a shank portion, comprising: a hollow body member having opposed end walls and serving as a comustion and exhaust chamber, there being provided inlet port means through which is supplied combustible gas and gas to support combustion to said chamber, said inlet port means being located at one end of said hollow body member and said outlet port means being located at the opposite end of said hollow body member and adjacent the material to be formed; the walls of said hollow body member being imperforate except for said inlet and outlet port means; an axial impact receiving member disposed within said body member and provided with an axial bore to receive the shank portion of said forming tool; said inlet port means adapting said body member to receive said conduit means to thereby totally enclose said combustion and exhaust chamber except at the outlet port means; whereby products of combustion will transmit heat directly to said axial member and the shank portion of said forming tool, and will flow out of said body member through said outlet port means and onto the material to be formed.

3. A device as claimed in claim 2; and at least one partially obstructing partition member extending laterally across a medial portion of said body member to divide the interior thereof into at least one combustion chamber adjacent said inlet port means and at least one exhaust chamber adjacent said outlet port means.

4. A device as claimed in claim 2; and in addition thereto; a partition member extending laterally across a medial portion of said body member serving to divide said combustion and exhaust chamber into sub-chambers; and means formed in said partition member forming a passage-way between the sub-chambers adjacent said partition member, said passage-way forming means being located with respect to said inlet port means so as to cause any combustible gas which may be injected into said body member through said inlet port means, and its combustion products, to flow in a generally helical path around the axis of said axial member before being discharged from said body member through said outlet port means.

5. A device as claimed in claim 2; and a gas injection tube having a first end adapted for connection to said conduit means and a second end mounted on said body member at said inlet port means in such a geometrical relation to said body member as will cause gas injected through said tube and inlet port means into said body member to flow in a generally helical path around said axial member before flowing out of said body member through said outlet port means.

6. A device as claimed in claim 2; and in addition thereto; a gas injection tube having a first end adapted for connection to said conduit means and a second end mounted on said body member at said inlet port means in such a geometrical relation to said body member as will cause gas injected through said tube and inlet port means into said body member to commence flowing in a generally helical path around said axial member; and a helically shaped barrier member disposed within said body member to constrain said gas and its combustion products to continue to flow in a generally helical path around said axial member before flowing out of said body member through said outlet port means.

7. A device as claimed in claim 2 and in addition thereto; a gas injection tube having a first end adapted for connection to said conduit means and a second end mounted on said body member at said inlet port means in such geometrical relation to said body member as will cause the gases injected through said tube and inlet port means into said body member to flow in a generally helical path around said axial member before flowing out of said body member through said outlet port means; a partition member extending laterally across a medial portion of said body member serving to divide said combustion and exhaust chamber into sub-chambers; and means in said partition member forming a passageway between said sub-chambers, said passage-way forming means being located with respect to said inlet port means so as to allow said gases and their combustion products to continue to flow in said generally helical path around said axial member.

References Cited in the file of this patent

UNITED STATES PATENTS

| | | |
|---|---|---|
| 319,417 | Krieg | June 2, 1885 |
| 408,408 | Eversole | Aug. 6, 1889 |
| 826,943 | Kieffer et al. | July 24, 1906 |
| 835,614 | Hebrank | Nov. 13, 1906 |
| 951,060 | Driessche | Mar. 1, 1910 |
| 1,469,714 | Broch | Oct. 2, 1923 |
| 1,981,808 | Maranville | Nov. 20, 1934 |
| 2,242,204 | Kennedy | May 13, 1941 |
| 2,396,218 | Watters | Mar. 5, 1946 |
| 2,424,643 | Williams | July 29, 1947 |
| 2,453,762 | Schwartz | Nov. 16, 1948 |
| 2,455,702 | Rechton et al. | Dec. 7, 1948 |
| 2,491,717 | Creighton | Dec. 20, 1949 |
| 2,512,541 | Garritson | June 20, 1950 |
| 2,561,200 | Hess | July 17, 1951 |

FOREIGN PATENTS

| | | |
|---|---|---|
| 18,759 | Great Britain | of 1888 |
| 304,472 | Germany | Mar. 16, 1918 |
| 165,989 | Great Britain | July 14, 1921 |
| 218,840 | Great Britain | July 17, 1924 |
| 361,060 | Great Britain | Nov. 19, 1931 |